(12) United States Patent
Hanser et al.

(10) Patent No.: US 7,806,417 B1
(45) Date of Patent: Oct. 5, 2010

(54) HEIGHT AVERAGING MEANS FOR USE WITH A MOTOR VEHICLE SUSPENSION CONTROL SYSTEM

(75) Inventors: Paul Edmund Hanser, Tipton, IA (US); Marc Frerichs, Eldridge, IA (US)

(73) Assignee: HWH Corporation, Moscow, IA (US)

( * ) Notice: Subject to any disclaimer, the term of this patent is extended or adjusted under 35 U.S.C. 154(b) by 173 days.

(21) Appl. No.: 12/206,008

(22) Filed: Sep. 8, 2008

(51) Int. Cl.
*B60G 17/019* (2006.01)
*B60G 3/04* (2006.01)

(52) U.S. Cl. .............. 280/5.514; 280/6.153; 280/6.157; 280/124.134

(58) Field of Classification Search .............. 280/5.502, 280/5.507, 5.508, 5.509, 5.514, 6.15, 6.153, 280/6.154, 6.157, 6.159, 6.16, 124.134, 124.135, 280/124.157
See application file for complete search history.

(56) References Cited

U.S. PATENT DOCUMENTS

| | | | |
|---|---|---|---|
| 3,194,581 A | * | 7/1965 | Brueder .................. 280/6.157 |
| 4,923,210 A | | 5/1990 | Heider et al. |
| 6,665,597 B1 | | 12/2003 | Hanser et al. |
| 6,991,239 B2 | | 1/2006 | Schutt et al. |
| 7,192,033 B2 | | 3/2007 | Bolt et al. |
| 2006/0255550 A1 | * | 11/2006 | Pfeil et al. ............... 280/5.509 |

* cited by examiner

*Primary Examiner*—Paul N Dickson
*Assistant Examiner*—Joseph Rocca
(74) *Attorney, Agent, or Firm*—Brett D. Papendick; Shuttleworth & Ingersoll, PLC

(57) ABSTRACT

A means to average the left and right tire height positions relative to the chassis of a vehicle having an independent suspension system. The averaging means uses a rigid member having a first end and a second end wherein the first end is combined with the driver's side independent suspension and the second end is combined with the passenger's side independent suspension. As each side of the vehicle's suspension moves up and down, the ends of the rigid member also move up and down. A sensor determines the average height of the rigid member and communicates that information to the ride-height control system.

8 Claims, 9 Drawing Sheets

HEIGHT AVERAGING MEANS FOR USE WITH A MOTOR VEHICLE SUSPENSION CONTROL SYSTEM

BACKGROUND

Ride-height control systems for motor homes and recreational vehicles (RVs) are well known in the art. These systems typically utilize air suspension systems which permit the distance between the axles and chassis to be adjusted according to the amount of pressure within the air bags. The ride-height of the vehicle may therefore be adjusted for varying loading conditions, road conditions, wind, and rough terrain. Systems for maintaining a particular ride-height for varying conditions generally utilize a vehicle pneumatic system, comprised of an air compressor and air tank, and a pneumatic valve connected to each of the vehicle air bags. Each of the valves is secured to the vehicle chassis and connected to the vehicle axle by means of a mechanical linkage. As the distance between the chassis and axle fluctuates, air is supplied to, or vented from, each air bag through its respective valve. Examples of such ride-height control systems are described in U.S. Pat. Nos. 4,923,210 (Heider et al.) and 6,665,597 (Hanser et al.).

Typically, RVs and buses use two height control sensors on their rear axles—one on their rear passenger side and one on their rear driver side. These height control sensors measure the distance between the tire (or some other first component) which moves relative to the chassis (or some other second component) to determine whether the air bags need to be inflated or deflated. Traditionally, on a vehicle with a solid axle on its front end, a sensor is actuated, via linkage, at the middle of the axle to provide an average of the relative height of the left-front tire and right-front tire. However, this method is not possible on vehicles having an independent front suspension. To overcome this problem, some prior designs attach the height control sensor linkage to an anti-roll bar; however, not all suspensions can be fitted with an anti-roll bar. Further, some owners do not want the handling characteristics associated with an anti-roll bar. Another prior design mounts a single height control sensor to just one side of the independent front suspension. However, this does not provide an average of the left and right tire height positions.

SUMMARY

This invention provides a means to average the left and right tire height positions relative to the chassis of a vehicle having an independent suspension system. The averaging means uses a rigid member having a first end and a second end wherein the first end is combined with the driver's side independent suspension and the second end is combined with the passenger's side independent suspension. As each side of the vehicle's suspension moves up and down, the ends of the rigid member also move up and down. A sensor determines the average height of the rigid member and communicates that information to the ride-height control system.

DETAILED DESCRIPTION

Figure 1:
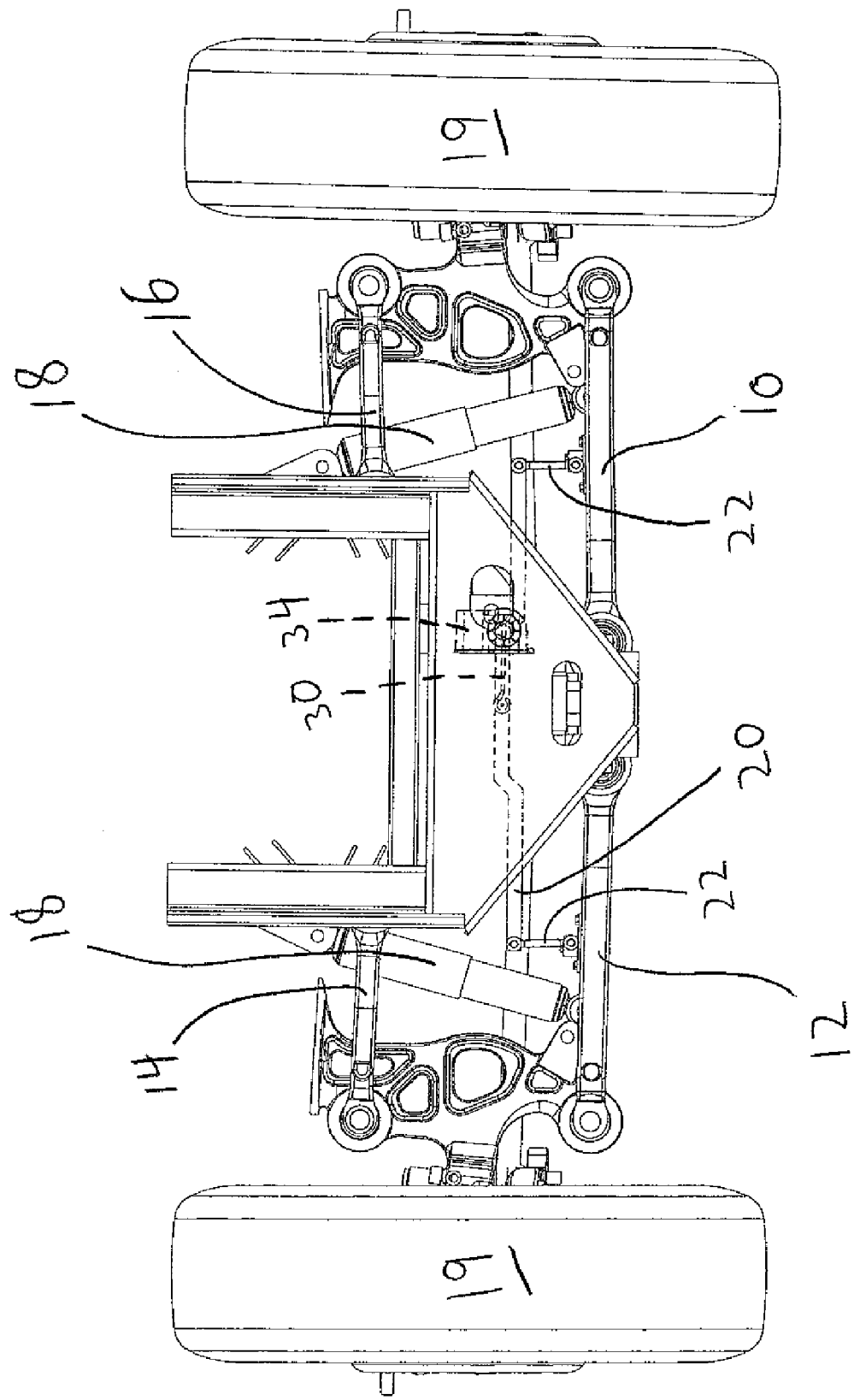
FIG. 1 is a front view.
Figure 2:
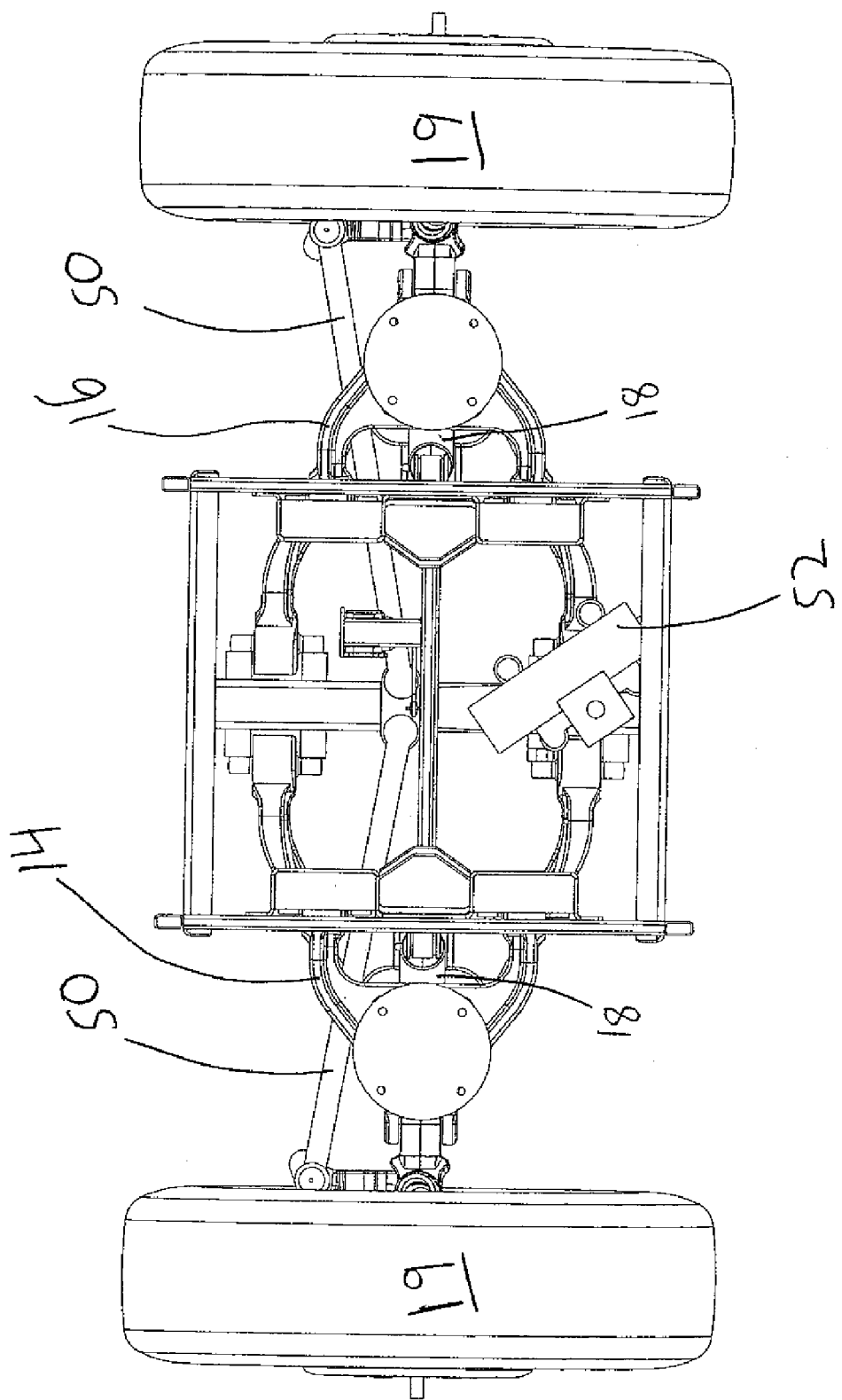
FIG. 2 is a top view.
Figure 4:
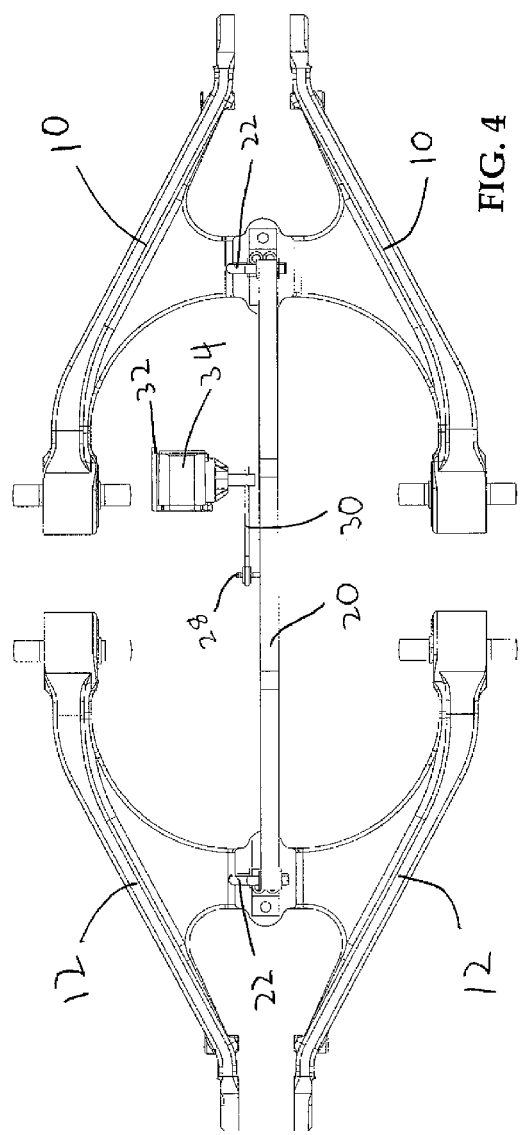
FIG. 4 is a top view.

The invention provides a means to average the left and right tire height positions relative to the chassis of a vehicle, such as a recreational vehicle or bus. FIG. 1 shows a front view of the suspension system of a vehicle including two upper control arms 14, 16, two lower control arms 10, 12, shock absorbers 18, and tires 19. FIG. 2 shows a top view of the front independent suspension system of FIG. 1 showing steering tie rods 50, steering box 52, and tires 19. The invention is described herein as being combined with the front independent suspension system of a vehicle; however, the invention may be used on any other independent suspension system including a rear independent suspension system.

Figure 3:
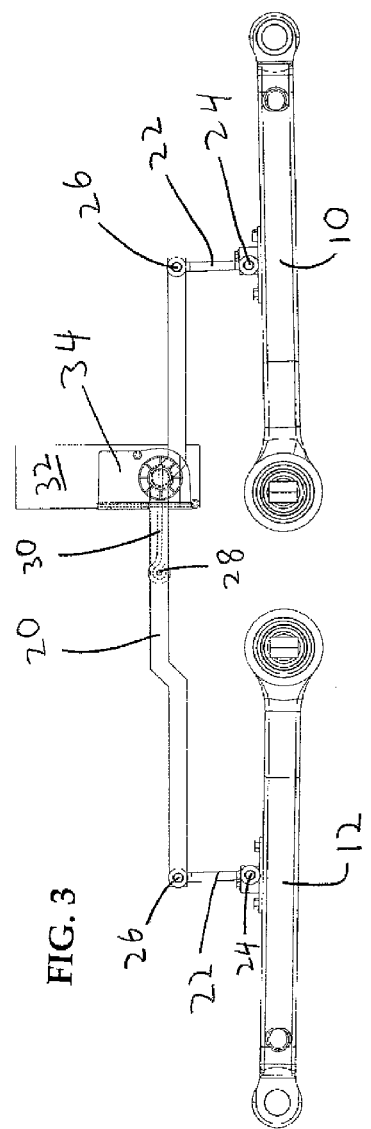
FIG. 3 is a front view.
Figure 5:
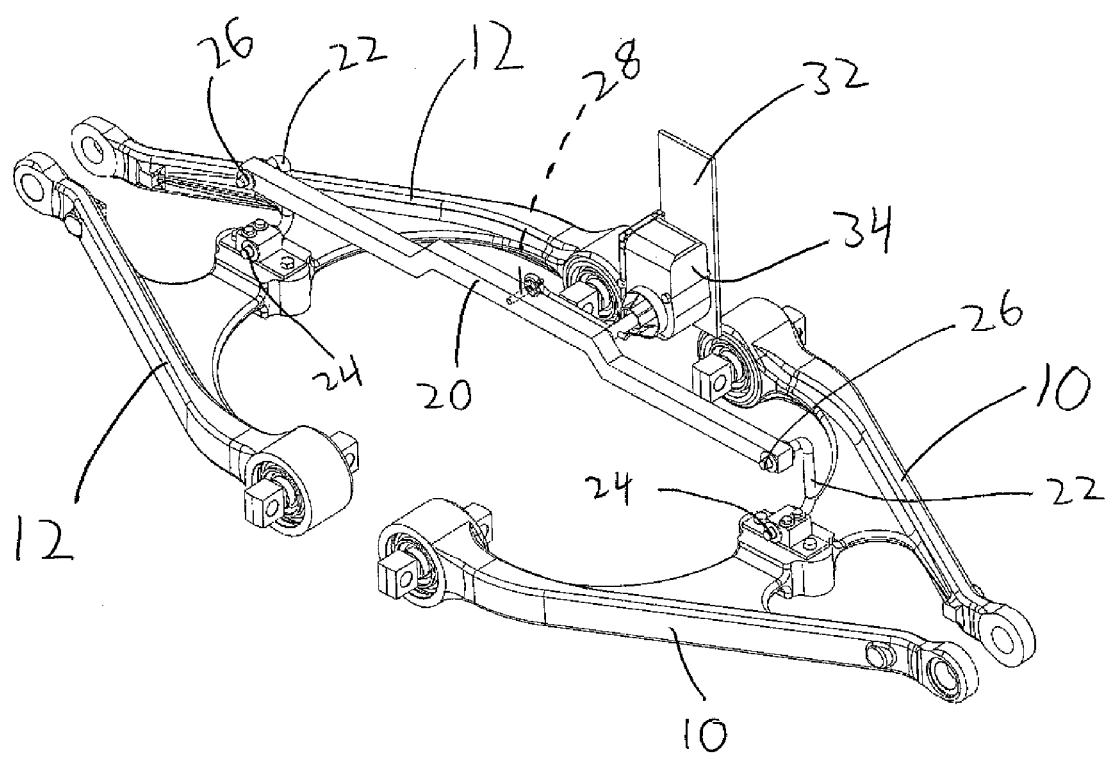
FIG. 5 is a perspective view.

FIGS. 3, 4, 5 and 6(a)-6(e) show a first embodiment of the invention. FIG. 3 is a front view similar to FIG. 1 with portions of the suspension system removed for clarity. FIG. 3 shows a rigid member 20 pivotally combined with the lower control arms 10, 12. Lower control arm 10 is part of the driver's side independent suspension system and lower control arm 12 is part of the passenger's side independent suspension system. In this embodiment, the rigid member 20 is combined with each control arm 10, 12 via a pin 22 having an upper pivot point 26 and a lower pivot point 24. The combination of the rigid member 20 with the control arms 10, 12 allows the rigid member 20 to move up and down as the control arms 10, 12 move up and down with the suspension of the vehicle.

Generally, the rigid member 20 can be any suitable shape. In the embodiments shown in FIGS. 1 and 3, the rigid member has an upward bend near its middle portion. This bend allows the rigid member 20 to fit around or clear some of the vehicle's steering components even when the vehicle's suspension is in its rebound or jounce position.

A sensor 34 determines the average height of the rigid member 20. Any suitable sensor that is capable of sensing the movement of the rigid member 20 may be used, including a mechanical valve, a linear potentiometer, or a height control sensor. In some embodiments, an optical sensor may be used to detect the position of the rigid member 20 so that a physical linkage between the rigid member 20 and sensor is not necessary.

As shown in FIG. 3, the rigid member 20 comprises an anchor pin 28 near the middle of the rigid member 20. An attachment member 30 pivotally combines the anchor pin 28 of the rigid member 20 with the sensor 34. The vertical movement of either or both of the control arms 10, 12 affects the position of the rigid member 20. Movement of the rigid member 20 upward or downward is detected by the sensor 34 via attachment member 30. The sensor 34 communicates the average height of the rigid member 20 to the vehicle's height control system to adjust the height of the chassis accordingly. The sensor 34 is combined with the vehicle's chassis by any suitable means. In the embodiment shown in FIG. 3, the sensor 34 is combined to the chassis via a mounting bracket 32.

Figure 6:
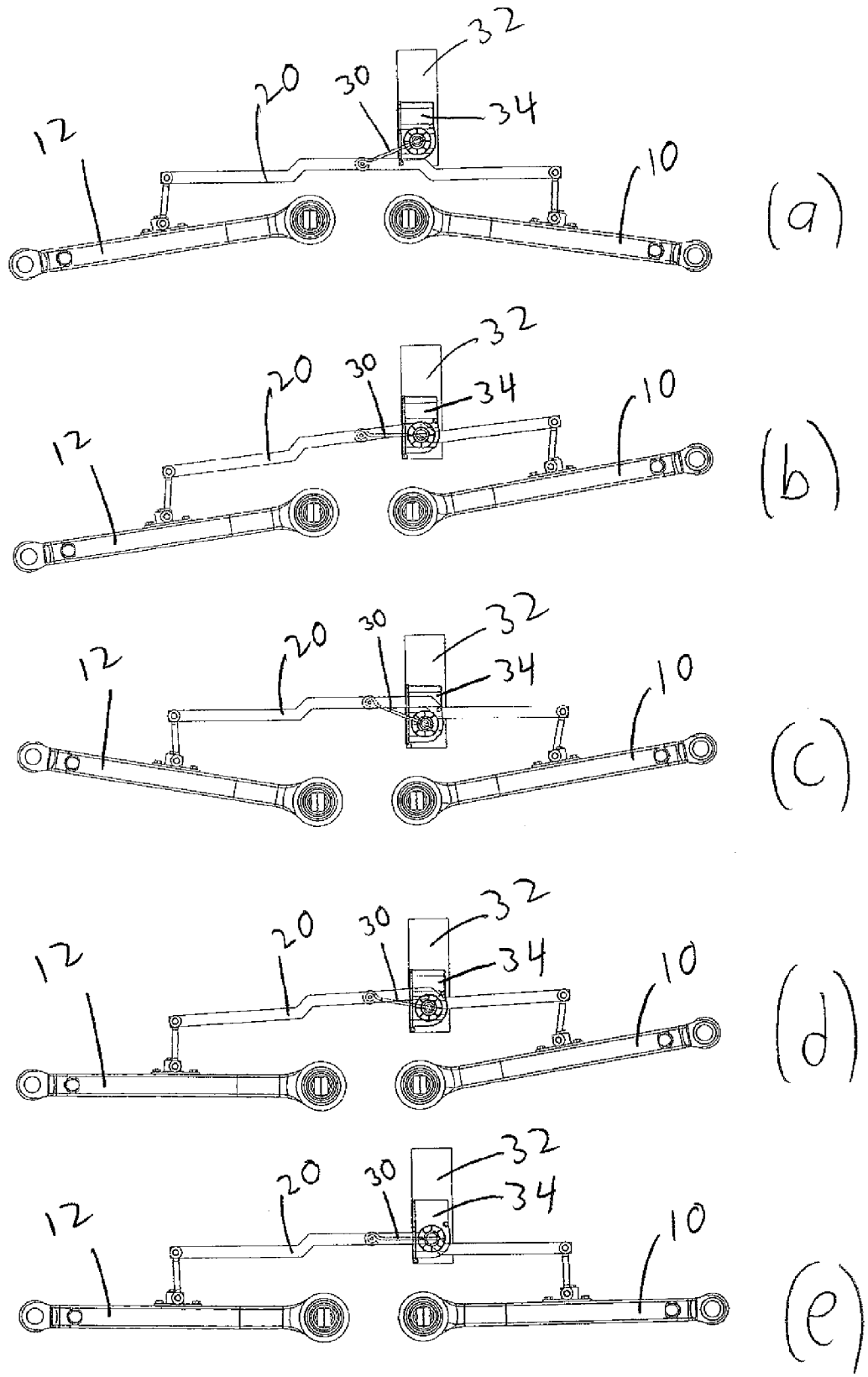
FIG. 6a is a front view showing the left and right control arm in a first position.
FIG. 6b is a front view showing the left and right control arm in a second position.
FIG. 6c is a front view showing the left and right control arm in a third position.
FIG. 6d is a front view showing the left and right control arm in a forth position.
FIG. 6e is a front view showing the left and right control arm in a fifth position.

FIGS. 6(a)-6(e) show how various positions of the control arms 10, 12 affect the position of the rigid member 20 and attachment member 30. When the tire 19/control arm 10, 12 is in its rebound position, the distance from the chassis to the ground is increased from normal ride height. When the tire 19/control arm 10, 12 is in its jounce position, the distance from the chassis to the ground is reduced from normal ride height. FIG. 6(a) shows both control arms 10, 12 in their rebound position. FIG. 6(b) shows control arm 10 in the jounce position and control arm 12 in the rebound position. FIG. 6(c) shows both control arms 10 in the jounce position. FIG. 6(d) shows control arm 10 in the jounce position and control arm 12 in the neutral position. FIG. 6(e) shows both control arms in the neutral position. Note that when one control arm 10, 12 is in full jounce and one is in full rebound as shown in FIG. 6(b), the attachment member 30 is in nearly in the same position as it is in the normal ride height shown in FIG. 6(e). This is because this suspension has any equal travel from the normal ride height to full jounce and full rebound. This shows how the rigid member 20 averages the tire travel throughout the tires motion.

FIGS. 7, 8, 9, and 10(a)-10(e) show a second embodiment of the invention. This embodiment is similar to the above described embodiment except that the pin 36 that connects control arm 10 to the rigid member 20 only has one pivot point. In the embodiment shown in FIG. 7, pin 36 is rigidly fixed to the control arm 10 and only has an upper pivot point 26. This arrangement helps to stabilize the rigid member 20 and prevent it from toggling too far in either direction.

Figure 7:
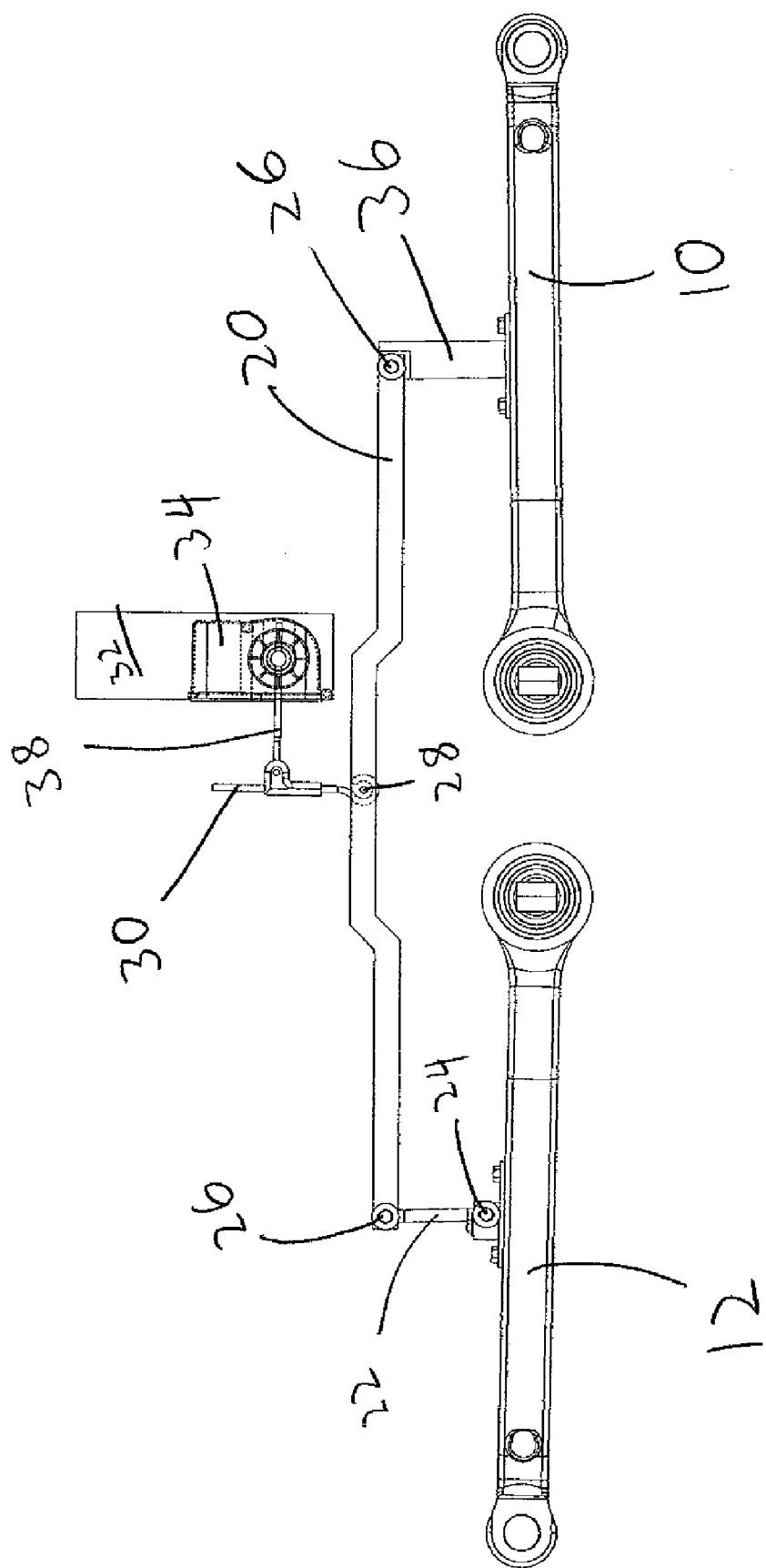
FIG. 7 is a front view of an alternate embodiment.
Figure 8:
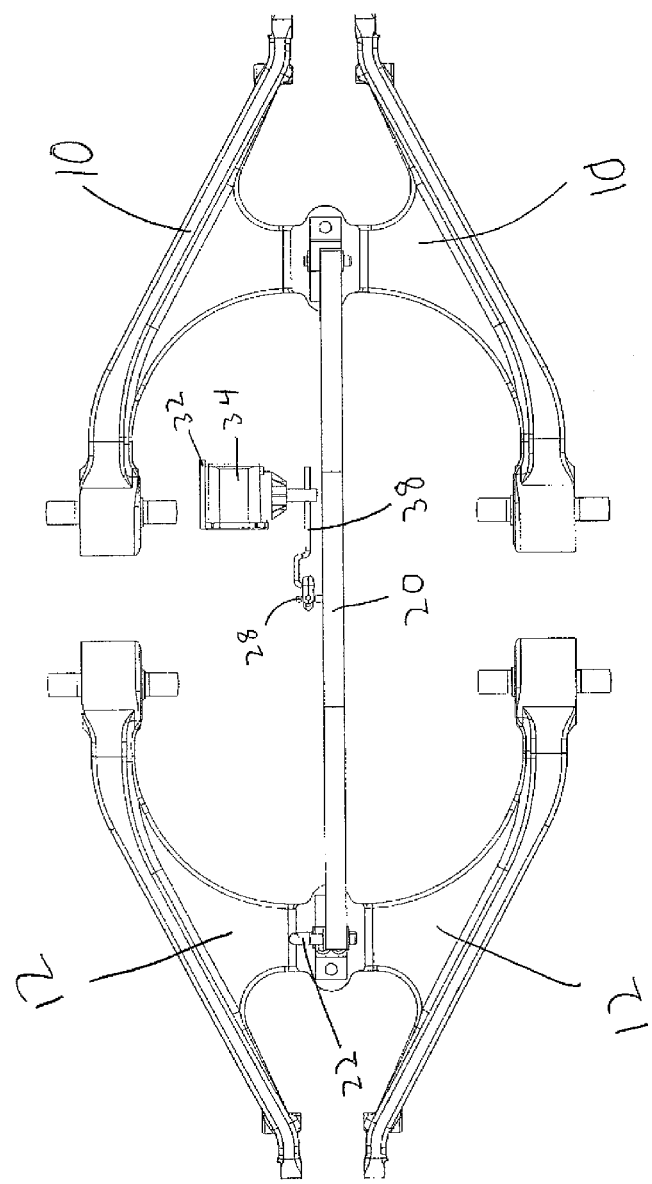
FIG. 8 is a top view of the embodiment shown in FIG. 7.
Figure 9:
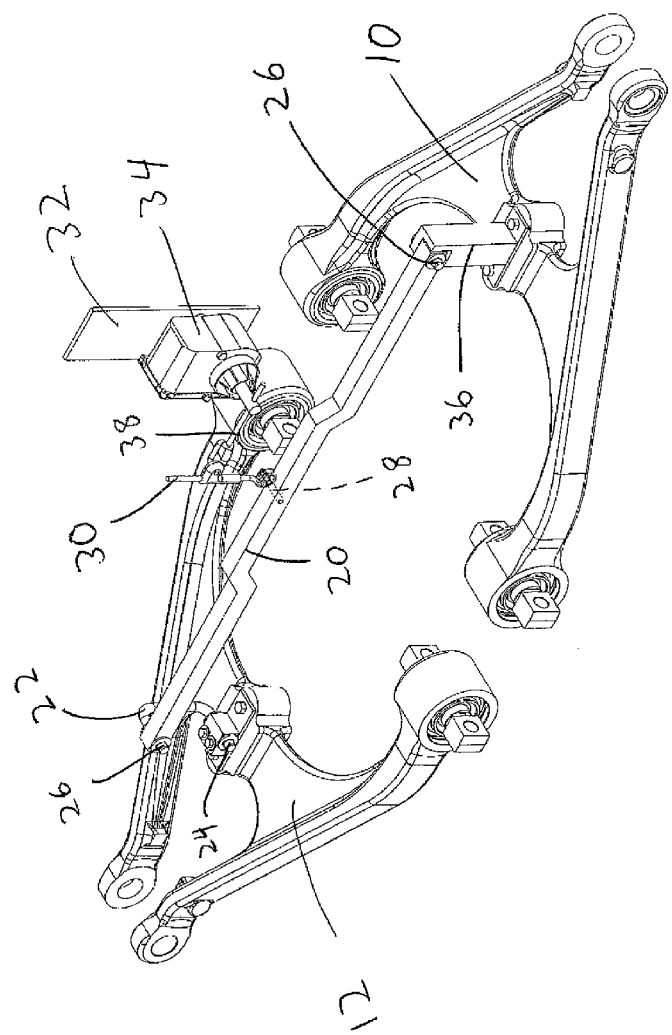
FIG. 9 is a perspective view of the embodiment shown in FIG. 7.
Figure 10:
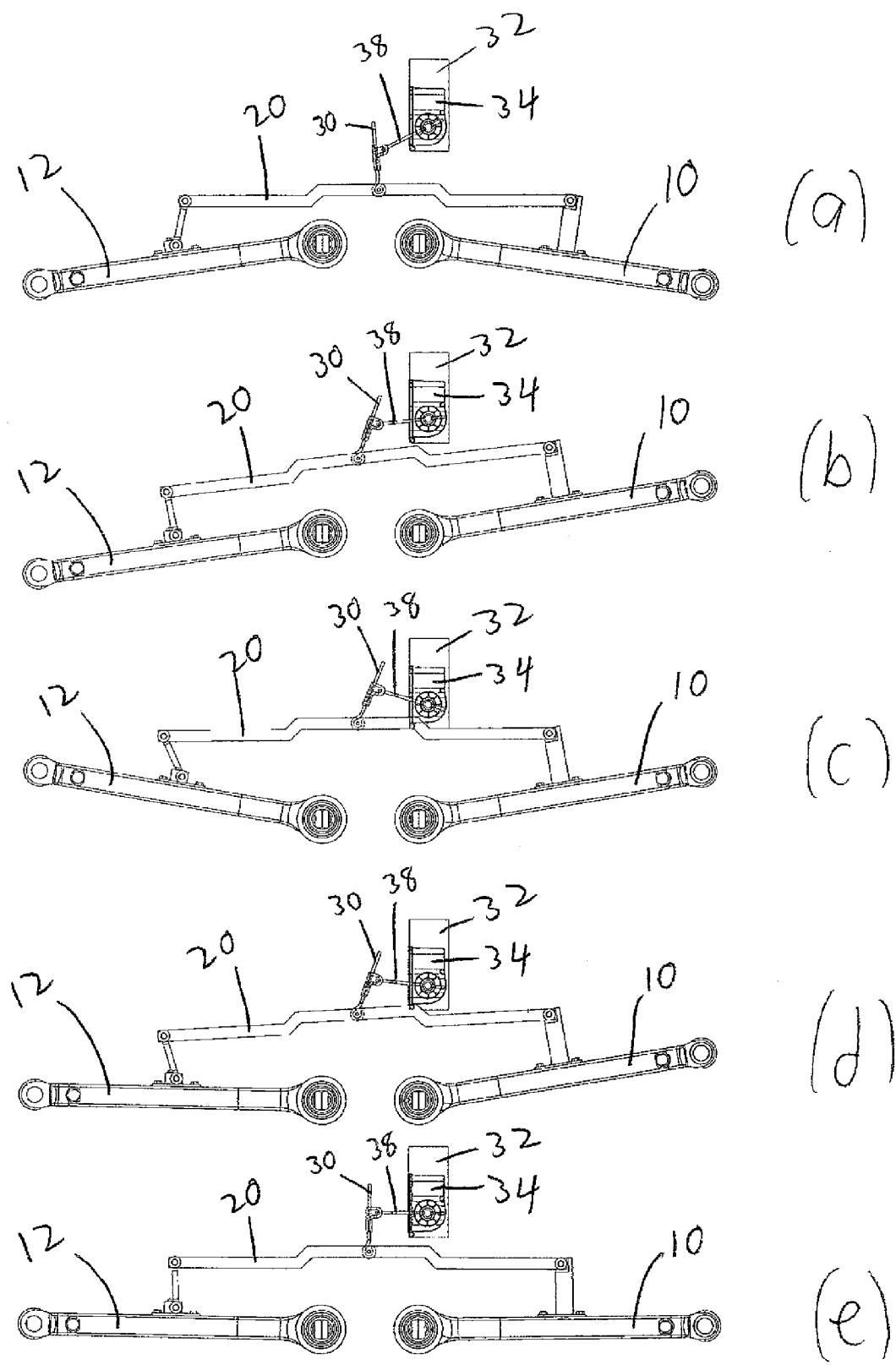
FIG. 10a is a front view of the embodiment shown in FIG. 7 showing the left and right control arm in a first position.
FIG. 10b is a front view of the embodiment shown in FIG. 7 showing the left and right control arm in a second position.
FIG. 10c is a front view of the embodiment shown in FIG. 7 showing the left and right control arm in a third position.
FIG. 10d is a front view of the embodiment shown in FIG. 7 showing the left and right control arm in a forth position.
FIG. 10e is a front view of the embodiment shown in FIG. 7 showing the left and right control arm in a fifth position.

The second embodiment is similar to the first in that the rigid member 20 is operatively combined with a sensor 34 so that the sensor 34 is able to detect the average height of the rigid member 20. As shown in FIG. 7, the second embodiment preferably uses a vertically orientated attachment member 30 coupled with linkage 38 to combine the height control sensor 34 with the rigid member 20. The vertical movement of the control arms 10, 12 will affect the position of the rigid member 20. Movement of the rigid member 20 upward or downward is detected by the sensor 34 via attachment member 30. The sensor 34 is combined with the vehicle's chassis by any suitable means. The sensor 34 can then adjust the height of the chassis accordingly as is known in the art.

FIGS. 10(a)-10(e) are similar to FIGS. 6(a)-6(e) which are described above.

The above describe embodiments provide that the rigid member 20 is combined with the lower control arms 10, 12. It should be noted that instead of the lower control arms 10, 12, the rigid member 20 may be combined with any movable member that is part of the suspension and moves vertically with the tires 19 relative to the vehicle's chassis (or other component that moves relative to the tires 19/independent suspension). For example, in alternate embodiments, the rigid member 20 may be combined with any of the following movable members: the upper control arms 14, 16, the wheel hub, the spring mounting plate, or the portion of the shock 18 that moves with the suspension.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. An assembly used with a vehicle having a chassis, a ride-height control system, a driver's side independent suspension system, and a passenger's side independent suspension system, said assembly for averaging the height of the driver's side suspension system and the passenger's side suspension system relative to the chassis, said assembly comprising:

a first movable member with the driver's side independent suspension system relative to the chassis;

a second movable member with the passenger's side independent suspension system relative to the chassis;

a rigid member having a first end and a second end wherein the first end is combined with the first movable member and the second end is combined with the second movable member; and a sensor for sensing the average height of the rigid member and communicating that information to the vehicle's ride-height control system.

2. The assembly of claim 1 wherein the first and second movable members are lower control arms.

3. The assembly of claim 1 wherein the sensor is a height control sensor.

4. The assembly of claim 1 wherein the sensor is an optical sensor.

5. The assembly of claim 1 further comprising a first pin having a first end and a second end and a second pin having a first end and a second end, wherein the first pin is combined with the rigid member at its first end and the first movable member at its second end and the second pin is combined with the rigid member at its first end and the second movable member at its second end.

6. The assembly of claim 5 wherein the pins have an upper pivot point at their first ends and a lower pivot point at their second ends.

7. The assembly of claim 5 wherein the first pin has an upper pivot point at its first end and a lower pivot point at its second end and the second pin has an upper pivot point at its first end and is rigidly fixed to the second movable member at its second end.

8. An assembly used with a vehicle having a chassis, a ride-height control system, a driver's side independent suspension system, and a passenger's side independent suspension system, said assembly for averaging the height of the driver's side suspension system and the passenger's side suspension system relative to the chassis, said assembly comprising:

a first movable member with the driver's side independent suspension system relative to the chassis;

a second movable member with the passenger's side independent suspension system relative to the chassis;

a rigid member having a first end and a second end wherein the first end is combined with the first movable member and the second end is combined with the second movable member;
a sensor combined with the vehicle's chassis for sensing the average height of the rigid member and communicating that information to the vehicle's ride-height control system;
an attachment member having a first end and a second end, wherein the attachment member is combined with the rigid member at its first end and combined with the sensor at its second end.

* * * * *